(12) United States Patent
Rytkönen et al.

(10) Patent No.: US 6,185,302 B1
(45) Date of Patent: Feb. 6, 2001

(54) TELEPHONE HOLDER

(75) Inventors: Jouko Rytkönen, Salo; Mika Pylvänäinen, Oulu; Jussi Pitkonen, Salo, all of (FI)

(73) Assignee: Nokia Mobile Phones Ltd., Espoo (FI)

( * ) Notice: Under 35 U.S.C. 154(b), the term of this patent shall be extended for 0 days.

(21) Appl. No.: 09/189,614

(22) Filed: Nov. 9, 1998

(30) Foreign Application Priority Data

Nov. 10, 1997 (FI) ........................................... 974183

(51) Int. Cl.⁷ ...................................................... H04M 1/00
(52) U.S. Cl. ............................................ 379/446; 379/455
(58) Field of Search ................................... 379/446, 454, 379/455, 426, 449; 248/221.3, 221.4, 309.1

(56) References Cited

U.S. PATENT DOCUMENTS

| | | | |
|---|---|---|---|
| 4,957,264 | 9/1990 | Hakanen | 248/510 |
| 5,016,851 | 5/1991 | Koskinen et al. | 248/278 |
| 5,040,712 | 8/1991 | Pesonen et al. | 224/42.45 R |
| 5,121,863 | 6/1992 | Kotitalo et al. | 224/42.45 R |
| 5,189,698 | 2/1993 | Hakanen | 379/455 |
| 5,597,102 | 1/1997 | Saarikko et al. | 224/197 |
| 5,708,707 | 1/1998 | Halttunen et al. | 379/446 |
| 5,825,874 | 10/1998 | Humphreys et al. | 379/446 |
| 5,828,750 | 10/1998 | Perala | 379/446 |
| 5,898,775 | * 4/1999 | Niemo et al. | 379/446 |

FOREIGN PATENT DOCUMENTS

| | | |
|---|---|---|
| 0 585 011 A1 | 3/1994 | (EP) . |
| 89650 | 7/1993 | (FI) . |
| 99253 | 9/1997 | (FI) . |
| 2 293 718 | 4/1996 | (GB) . |

* cited by examiner

*Primary Examiner*—Jack Chiang
(74) *Attorney, Agent, or Firm*—Perman & Green, LLP

(57) ABSTRACT

The invention relates to a telephone holder, especially a holder (2) installable on a car in which a phone (1) is kept during driving. The holder has an enclosed structure and it comprises a cup-like inner shell part (4), an outer shell part (5) and a locking element (7) fitted in the cavity between the shell parts and movable with respect to the shell parts, a thrust block (12) and locking claw (15) in the locking element being located in a hole (11) formed in the inner shell part. The phone is locked into the holder with a turning movement wherein the phone pushes the thrust block (12) and at the same time a guiding surface (16) in the outer shell part wedges the locking claw (15) into a hollow (17) on the side of the phone. The pushing movement is directed against the end (23) of a double torsion spring (22) in the holder so that the middle part of the spring turns a shaft (18) and thus locks the locking element (7) into the locked position. The phone is released from the locked position by pressing the shaft (18) by means of a push lever whereby the locking element is freed from a catch (20) and the end (23) of the spring returns the phone to the initial position so that it can be removed from the holder.

10 Claims, 6 Drawing Sheets

TELEPHONE HOLDER

BACKGROUND OF THE INVENTION

This invention relates to a telephone holder comprising at least one locking element which moves when pushed by a telephone inserted in the holder, and a guiding surface located against the locking element to wedge a locking claw in the locking element against the side of the telephone in such a manner that the claw locks the telephone into the holder.

Especially in a car it is needed a holder for a mobile phone where the phone can be kept in such a manner that the phone can be reached by the driver during a drive. The holder should include locking elements which hold the phone in its place so that it cannot drop off the holder during a drive while at the same time the holder must be such that the phone can be inserted in it and removed from it with a simple move of the hand.

A known telephone holder for car use is disclosed in published FI patent application 89650. That holder comprises two shell-like parts jointed onto each other in a turnable manner, said parts being positioned one within the other so that the inner part constitutes a mount for the phone and the outer part serves as stationary attachment part of the holder. Locking of the phone is in this holder arranged in such a manner that on both sides of the holder's inner part there is a flexible strip-like element which is attached at its bottom part to the holder and the tip of which forms a protruding locking claw which is wedged into a hollow on the side of the phone by a pressing surface on the outer part of the holder when the parts of the holder are turned with respect to each other. The joint pin between the parts of the holder serves as a retainer for the bottom part of the phone, and the phone is attached by using the phone supported by the pin as pushing means that turns the inner part of the holder with respect to the outer part. The parts of the holder are locked with respect to each other by a separate spring catch wherefrom the phone can be removed with a light pull when needed.

Because of the large parts movable with respect to each other the holder according to the published FI patent application 89650 is clumsy and its open unprotected construction is susceptible to failure. Especially for car use it would be advantageous to produce a more compact and rigid holder construction that would tolerate knocks and would facilitate easy attachment and removal of phone in addition to holding the phone reliably in its place in all circumstances.

The telephone holder according to the invention that meets the aforementioned objects is characterized in that the holder comprises an inner shell part serving as a mount for the phone, and an outer shell part which is stationary with respect to said inner shell part and includes a guiding surface so that a locking element is located between those parts and is movable with respect to them, that the inner shell part has a hole at a location corresponding to that of the locking element so that a locking claw is pushed against the side of the phone through said hole, and that the locking element includes a thrust block such that when said thrust block is pushed the phone forces the locking element into the locked position.

Instead of the flexible strip in the inner shell part according to the published FI patent application 89650 the locking element in the holder according to the invention comprises a separate moving element which is substantially encapsulated between the inner shell part and the opposing stationary outer part. Said outer part may together with the inner shell part form a continuous housing which is closed except for the hole in the inner shell part required by the locking element's locking claw and thrust block. This way a rigid, durable construction can be provided in which a locking element and the spring catch, which locks the locking element into the locked position, are well protected.

The locking element's thrust block, which is pushed by the phone, and the locking claw may be located successively in the pushing direction in a hole formed in the inner shell part of the housing. The connecting part between the thrust block and locking claw is advantageously a flexible shaft pushed by the guiding surface to wedge the locking claw against the side of the phone, into a hollow corresponding to the locking claw and positioned suitably on the side of the phone. Locking of the phone into the holder is preferably realized on both sides of the phone by means of mutually symmetric locking elements located on the opposite sides of the holder.

Pushing the phone into the locking position is advantageously realized against a spring such that when the locking element is freed from said position the spring unlocks the phone from the holder. Locking of the locking element into the locked position is caused by a catch in the holder which may be connected to a push lever with which the locking elements can be unlocked from the catch in such a manner that thereafter spring force causes the phone to be released from the holder. The catch, too, is spring-operated, and a preferred embodiment of the invention is characterized in that the holder is equipped with a double torsion spring connected by its ends to locking elements on the opposing sides of the holder in such a manner that the pushing movement of the locking elements is directed against the ends of the spring while at the same time the middle part of the spring is pressing a shaft by means of which the locking elements are locked in their places in the locked position.

To guide the return movement of a locking element freed from the locked position the inner shell part of the holder advantageously includes a guiding surface which makes the locking claw to retreat from the hollow on the side of the phone. The phone, which thus has been unlocked, can be lifted off the holder.

BRIEF DESCRIPTION OF THE DRAWINGS

The invention will now be described in more detail by means of an example and referring to the accompanying drawing wherein.

DETAILED DESCRIPTION OF THE PREFERRED EMBODIMENTS

Figure 1:
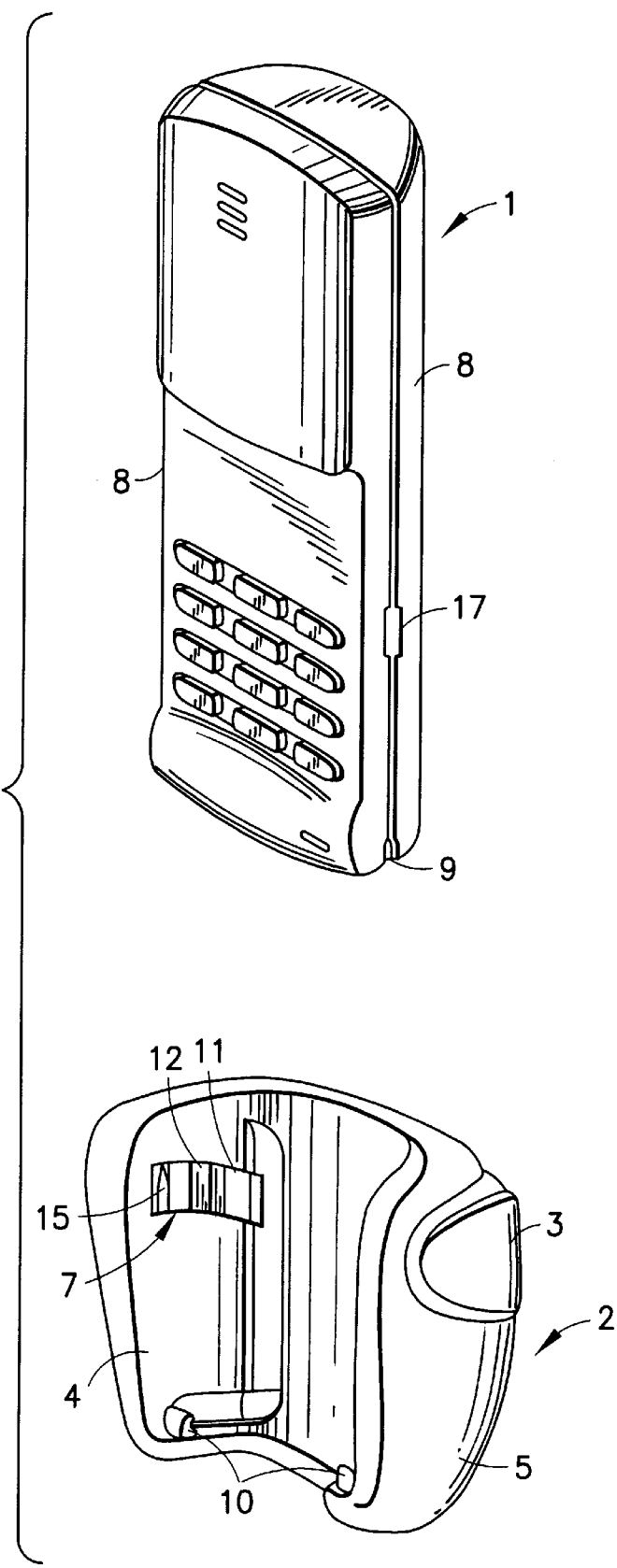
FIG. 1 shows a mobile phone and the telephone holder according to the invention.

FIG. 1 shows a mobile phone 1 and the holder 2 according to the invention which is designed to be installed on a car, for example, so that it can be reached by the driver. The phone 1 can be inserted in the holder 2 and locked into it with a simple move of the hand, and the removal of the phone from the holder is done by pressing the push levers 3 on the sides of the holder.

The holder, the structure of which can best be seen from FIGS. 2 to 5, comprises mainly a stationary, enclosed piece that includes a cup-like inner shell part 4 and against that an outer shell part 5, which confine between them a cavity 6 containing locking elements 7 on both sides of the holder. Thus the locking elements 7 lock the phone by its both sides 8 to the holder 2.

Figure 2:
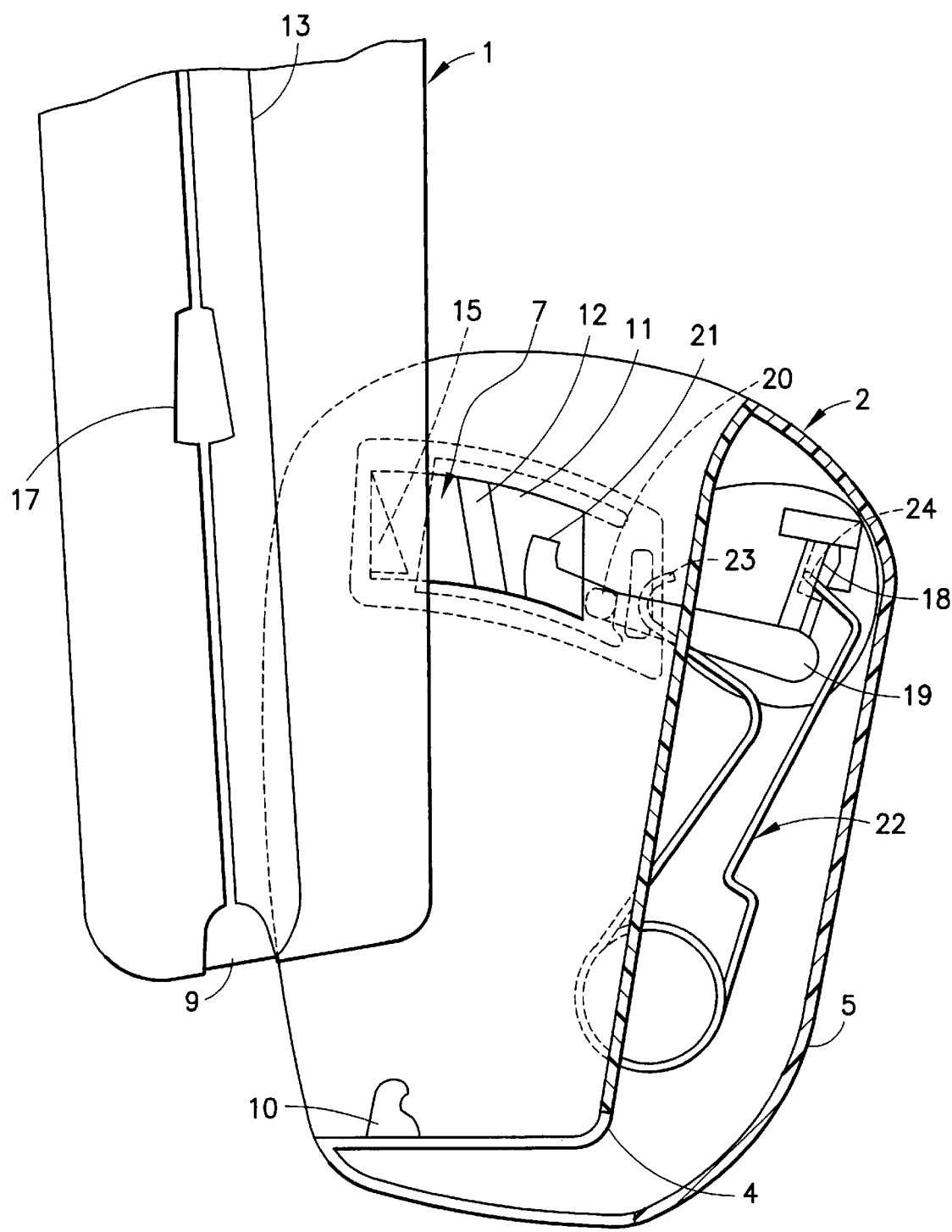
FIG. 2 shows a cross section of the holder according to FIG. 1 into which a phone is being inserted.

In accordance with FIG. 2 a phone 1 is inserted in the holder 2 by first fitting the notch 9 on the bottom part of the phone onto the pivots 10 on the opposing sides of the holder. The locking elements 7 are located on both sides of the holder 2 so that their positions match the curved holes 11 formed in the inner shell part 4 of the holder, each locking element comprising a thrust block 12 protruding from the hole against which the rear surface of the phone rests. As seen in FIGS. 2 and 4, the rear surface of the phone 1 includes shoulders 13 the locations of which correspond to those of said thrust blocks 12. The phone 1 is locked into the holder 2 by turning the phone with respect to the pivots 10 so that the phone and more specifically its shoulders 13 push the thrust blocks 12 of the locking elements 7 along a curved path backwards until the locking elements are caught in the locked position according to FIGS. 3 and 5.

Figure 3:
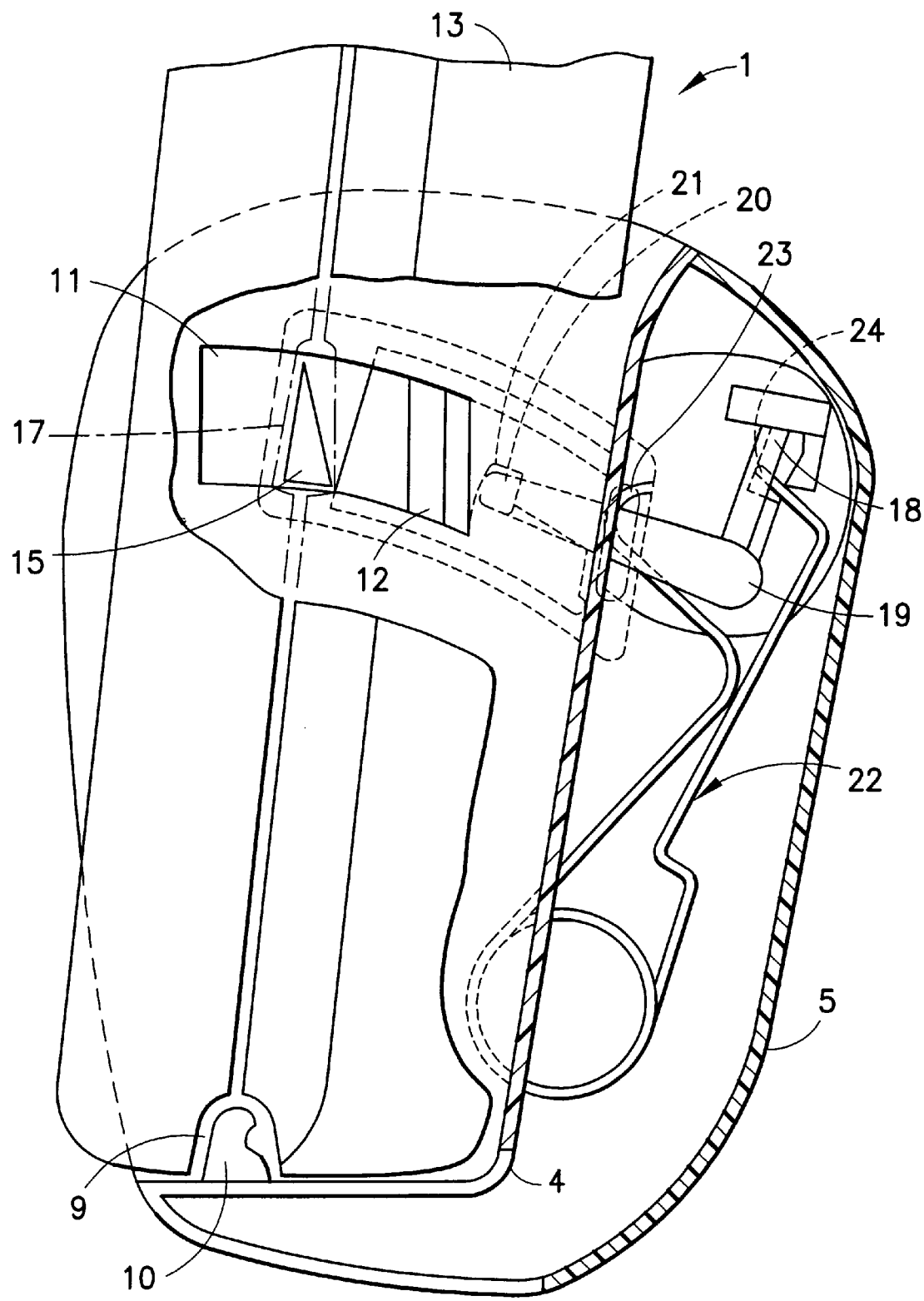
FIG. 3 shows a cross section of the holder according to FIG. 1 with a phone locked into the holder.
Figure 4:
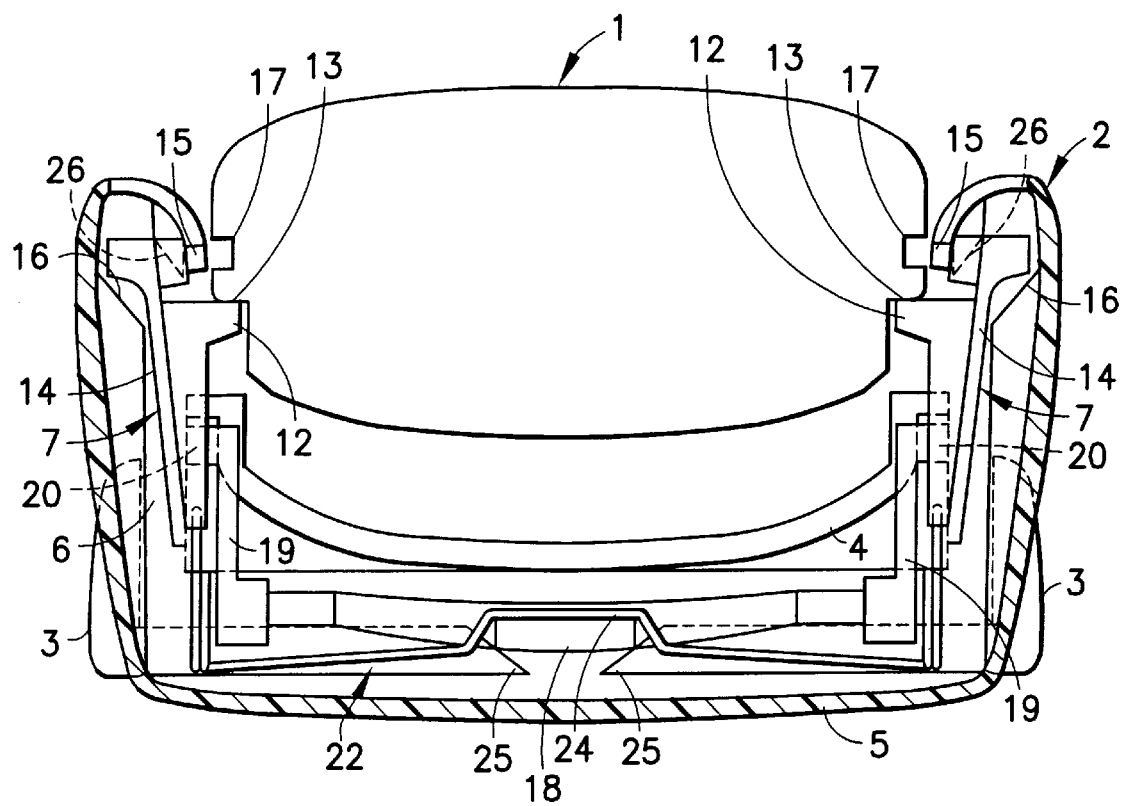
FIG. 4 shows a horizontal section of the holder according to FIG. 1 with a phone inserted in it before the phone is pushed into the locked position.
Figure 5:
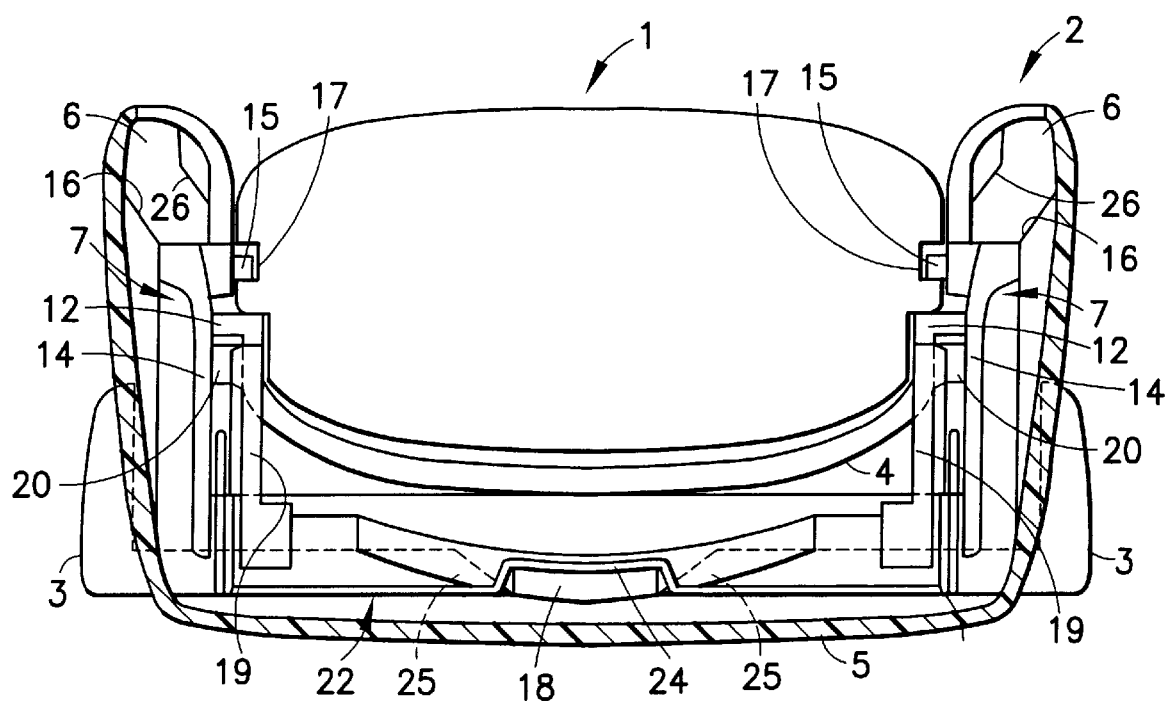
FIG. 5 shows the horizontal section of FIG. 4 of the holder according to FIG. 1 with the phone in the locked position.

Operation of the locking elements 7 in the locking of the phone 1 can best be seen from FIGS. 4 and 5. Each of the locking elements comprises in addition to the thrust block 12 a locking claw 15 equipped with a flexible shaft 14, which claw in the initial position of the locking movement is retracted in a hole 11 in the inner shell part 4 of the holder, as shown in FIG. 4. When the phone pushes the locking element 7 backwards, the beveled guiding surface 16 formed on the outer shell part 5 of the holder presses the locking claw 15 towards the side 8 of the phone so that in the locked position shown in FIG. 5 the locking claw has been wedged into a hollow 17 formed for this purpose on the side of the phone. The pivots 10 and locking claws 15 thus hold the phone locked into the holder 2. The locking elements 7 are latched into the locked position according to FIGS. 3 and 5 by a locking shaft 18 situated between the shell parts 4, 5 of the holder with latches 19 at its both ends, the ends 20 of said latches being adapted to lock into corresponding holes 21 in the locking elements.

Figure 6:
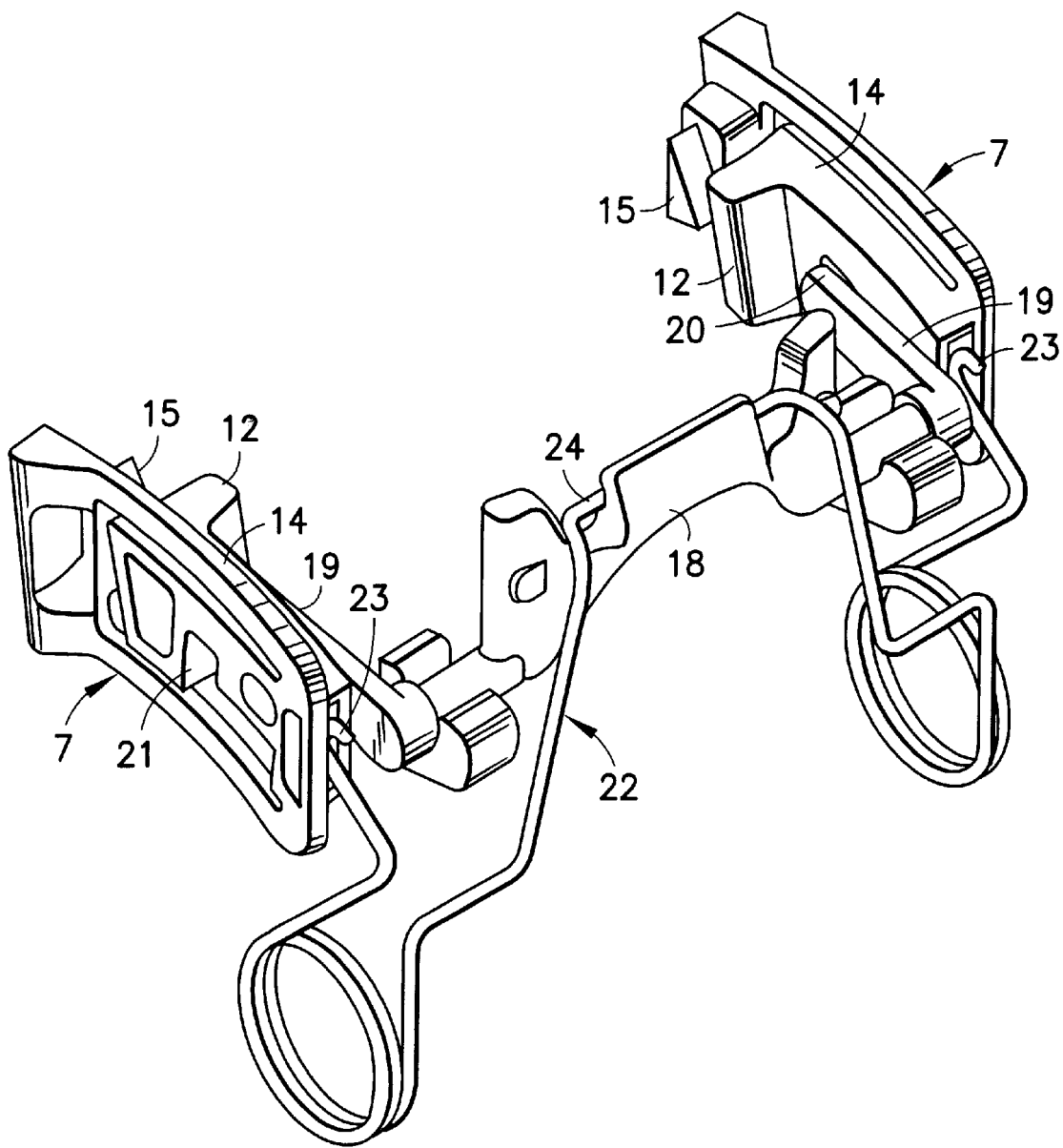
FIG. 6 shows the holder's locking elements, double torsion spring and catches with their shafts without the shell parts and push levers.

Latching of the locking elements 7 into the locked position according to FIGS. 3 and 5 and their freeing from the locked position in order to release the phone from the holder are controlled by means of said locking shaft 18 and latches 19, the double torsion spring 22, which operates said locking shaft and its latches, and push levers 3. The double torsion spring 22 and its connection to the locking shaft 18 and locking elements 7 can best be seen from FIG. 6. The act of bringing the locking elements 7 into the locked position by pushing on the thrust blocks 12 is directed against the spring force of the ends 23 of the double torsion spring 22 so that at the same time the middle part 24 of the spring presses the locking shaft 18 at the middle in such a manner that the ends 20 of the latches are driven into the holes 21 of the locking elements in the locked position. When the phone is released from the locking, either or both of the push levers 3 are pushed so that the beveled surfaces 25 (FIGS. 4 and 5) of the push levers push the locking shaft 18 at the middle, causing the shaft to turn in such a manner that the ends 20 of the latches are retracted from the holes 21 in the locking elements, whereby the spring force of the ends 23 of the double torsion spring thrusts the released locking elements 7 forwards while the thrust blocks 12 in the locking elements push the phone to the release position (FIG. 4). During this movement the beveled guiding surface 26 formed on the inner shell part 4 of the holder pushes the locking claw 15 away from the side 8 of the phone so that the locking claws 15 retract into the holes 11 on the sides of the inner shell part 4. The released phone 1 can then be lifted off the holder 2.

It is obvious to a person skilled in the art that various embodiments of the invention are not lifted to the example described above but they can be modified within the scope of the patent defined by the claims set forth below.

What is claimed is:

1. A holder (2) for a telephone (1), comprising at least one locking element (7) that moves when pushed by a phone inserted in the holder, and a guiding surface (16) located against the locking element to wedge a locking claw (15) onto the side (8) of the phone in such a manner that the claw locks the phone into the holder, said holder (2) comprising an inner shell part (4) serving as a mount for the phone (1), and an outer part (5) which is stationary with respect to said inner part and has a guiding surface (16), said locking element (7) being located between those parts and being movable with respect to them, the inner shell part having a hole (11) at a location corresponding to that of the locking element, from which hole the locking claw (15) protrudes against the side (8) of the phone, and the locking element including a thrust block (12) so that when said thrust block is pushed by the phone the locking element is forced into the locked position.

2. The holder of claim 1, wherein an inner (4) and outer (5) shell part which confine between them a cavity (6) in which the locking element (7) is mainly situated.

3. The holder of claim 1, wherein the locking element's thrust block (12) and locking claw (15) are located successively in the pushing direction of the phone (1) in one and the same hole (11) formed in the inner shell part (4).

4. The holder of claim 1, wherein the locking element's thrust block (12) is connected through a flexible shaft (14) to the locking claw (15) and the locking is performed so that the guiding surface (16) presses said shaft in such a manner that the locking claw is wedged into a hollow (17) on the side (8) of the phone (1).

5. The holder of claim 1, wherein the inner shell part (4) has a guiding surface (26) which guides the movement of the locking element (7), which has been released from the locked position, so that the locking claw (15) is retracted from the hollow (17) on the side (8) of the phone (1).

6. The holder of claim 1, wherein the holder (2) includes two separate holding elements (7) which attach the phone (1) to the holder by its opposing sides (8).

7. The holder of claim 1, wherein the holder (2) includes a pivot (10) which receives the bottom part (9) of the phone and the phone is turned with respect to said pivot when pushed against the thrust block (12) in the locking element (7).

8. The holder of claim 1, wherein the pushing movement of the locking element (7) is directed against a spring (23) and that the holder (2) includes a catch (20) which in the locking element's locked position locks the locking element in its place and to which a push lever (3) is connected to release the locking element from the catch.

9. The holder of claim 8, wherein the locking element (7) has a hole (21) into which the catch (20) is pushed by a spring (24) that exerts force on the catch.

10. The holder of claim 6, wherein the holder (2) includes a double torsion spring (22) connected by its ends (23) to locking elements (7) located at the opposing sides of the holder such that the pushing movement of the locking elements is directed against the ends of the spring while at the same time the middle part (24) of the spring presses a shaft (18) by means of which the locking elements (7) are locked into place in the locked position.

* * * * *